(No Model.)
H. R. ALLEN.
CUTTER BAR, &c., FOR MOWING AND REAPING MACHINES.
No. 291,019. Patented Jan. 1, 1884.
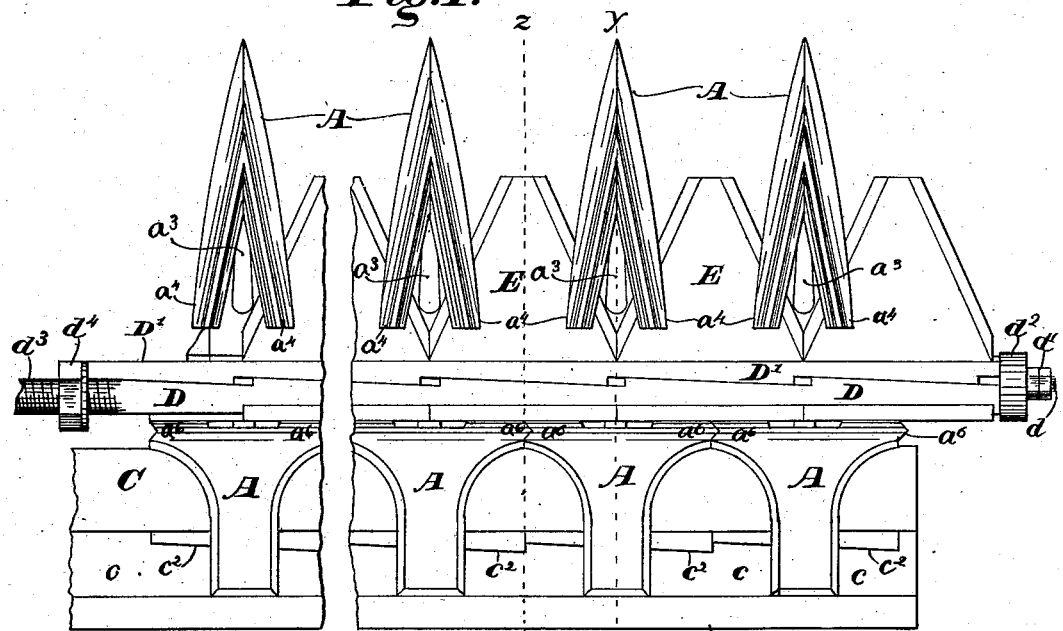
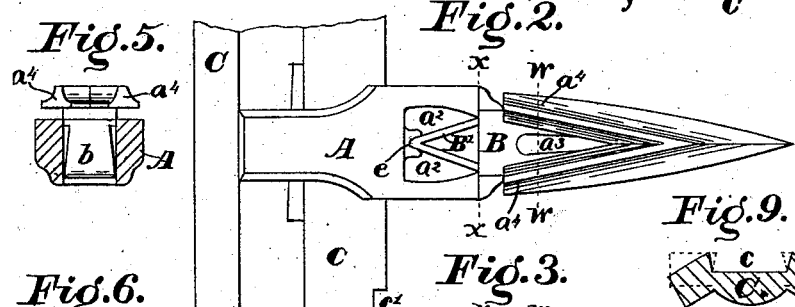
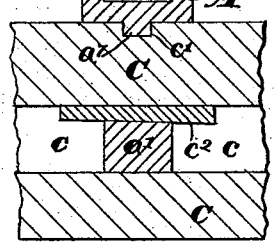
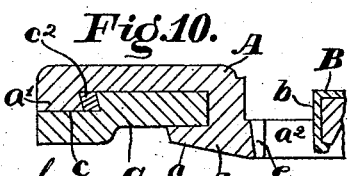
WITNESSES:
Chas. N. Leonard
E. W. Bradford
INVENTOR.
Horace R. Allen,
PER
C. Bradford,
ATTORNEY.
N. PETERS, Photo-Lithographer, Washington, D. C.

UNITED STATES PATENT OFFICE.

HORACE R. ALLEN, OF INDIANAPOLIS, INDIANA.

CUTTER-BAR, &c., FOR MOWING AND REAPING MACHINES.

SPECIFICATION forming part of Letters Patent No. 291,019, dated January 1, 1884.

Application filed May 5, 1883. (No model.)

*To all whom it may concern:*

Be it known that I, HORACE R. ALLEN, of the city of Indianapolis, county of Marion, and State of Indiana, have invented certain new and useful Improvements in Cutter-Bars, &c., for Mowing and Reaping Machines, of which the following is a specification.

My said invention consists in certain improvements in the guards or fingers of mowing or harvesting machines, in the ledger-plates in said fingers, in the finger-bars upon which said guards or fingers are mounted in the cutter-bars, and the knives thereon, as will be hereinafter particularly described and claimed.

Referring to the accompanying drawings, which are made a part hereof, and on which similar letters of reference indicate similar parts, Figure 1 is a top or plan view of portions of the cutting apparatus of a mowing or harvesting machine embodying my invention; Fig. 2, a similar view of one of the guards and a portion of the finger-bar, the cutter-bar and its knives being removed, and the guard being of a slightly-different construction; Fig. 3, a sectional view on the dotted line $z\ z$ in Fig. 1; Fig. 4, a sectional view on the dotted line $y\ y$; Fig. 5, a cross-section of the guard on the dotted line $x\ x$; Fig. 6, a cross-section of the guard on the dotted line $w\ w$; Fig. 7, a horizontal section of the outer end of the cutter-bar and parts thereon; Fig. 8, a horizontal section through a portion of the finger-bar and a guard on the dotted line $v\ v$ in Fig. 3; Fig. 9, a cross-section of the finger-bar during the process of manufacture, its finished position being indicated by dotted lines; and Fig. 10, a view of an alternate construction of the finger-bar with a portion of a guard thereon.

In said drawings, the portions marked A represent the guards or fingers; B, the ledger-plates; B', wedges for holding the ledger-plates in position; C, the finger-bar; D, the cutter-bar, and E the knives or sections. The guards A preferably have in their rear ends grooves, into which the front edge of the bar C enters. The portion on one side of this groove (preferably the upper) extends back and is provided upon the side next the finger-bar with a dovetailed rib, $a'$, which enters into a corresponding groove in said finger-bar and thus secures said guards and finger-bar together. The portion upon the other side is simply the flange or projection $a$.

Each of the guards has wings $a^6$ on its sides, which extend out and come in contact with similar wings on the guards alongside it. One of these wings has a V-shaped notch and the other a V-shaped point, which interlock with the wings on the other guards. When the construction shown in Figs. 2 and 8 is employed, however, these wings may be left off, as shown in Fig. 2, the notches and lugs being sufficient to hold the guards in place on the bar. They have also openings $a^2$, into which the bent-down portions of the ledger-plates B enter, and openings $a^3$ down through their centers, through which the dirt and fine bits of grass carried in by the knives may fall to the ground. The front walls of the openings $a^2$ have dovetailed recesses therein, into which the similarly formed turned-down portions of the ledger-plate enter, and are thereby held securely down in place. The upper or shield portions of the guards are preferably divided or forked, as shown, and the edges or forks overhang the ledger-plates B.

Heretofore the shield portions of guards have generally been of the same width as or narrower than the ledger-plates, so that said ledger-plates might be ground without being removed from the guards.

As my ledger-plates are easily removable, they can be sharpened separately from the guards, and therefore the necessity for the old construction, which permitted said ledger-plates to be sharpened while in place, no longer exists. The ledger-plates B have turned-down portions $b$ at their rear ends, which are dovetailed, as shown in Fig. 5, to fit into the dovetailed recess in the front walls of the openings $a^2$, and the extreme lower end of which is bent around to hook under said wall, as shown in Fig. 4. The forward ends are inserted in suitable cavities $a^5$ in the forward ends of the fingers. This formation holds said plates firmly and securely in position when inserted in the fingers and fastened by the wedges B', and avoids the use of all screws, rivets, or like devices. Said wedges B' are preferably formed of sheet metal bent into triangular shape, as shown in Fig. 2, and are adapted to fit in behind the turned-down portions $b$ of the ledger-plates, and thus hold them in position. The rear portion slides in a groove, c, formed in the rear wall of the opening $a^2$. Said grooves are inclined somewhat, as shown in Fig. 4, so that when the wedges are driven down they force the ledger-plates tightly in place. These wedges are held in place by friction; but in case they should accidentally become loosened, they are prevented from escaping from their position by the cutter-bar, which passes over them.

The finger-bar C is substantially a flat bar having a dovetailed groove, c, upon one side, which is adapted to receive the corresponding rib $a'$ on the finger A, and is preferably swelled somewhat on the other side to compensate for the loss of metal sustained in forming the groove. This bar is preferably of rolled iron or steel, and is formed in the following manner: The bar is first rolled into substantially the form shown by the full lines in Fig. 9, which makes the thickness and shape of its several parts exactly as desired. It is then run through a pair of plain rollers, and thus flattened down into the shape in which it is used, as shown in Figs. 3 and 4 and by the dotted lines in Fig. 9. In case the inside of the groove c is a little rough, a single pass through a planer may be necessary. If the groove is a little too large, the prongs of the rib $a'$, (which should be of malleable or wrought iron,) can be spread somewhat by a blow from a hammer or swage, and thus fitted. Notches $c'$ may be formed in the front edge of this bar, as shown in Figs. 2 and 8, into which corresponding projections $a^3$ on the guards A may fit, and thus form an additional means of holding said guards in place. When this formation is employed, the guards are first slipped onto the bar until the projections $a^3$ will fit into these notches $c'$, and are then drawn back by keys $c^2$, which are inserted in the groove c beside the rib $a'$. Instead of the form shown in the principal drawings, this bar C may be constructed, as shown in Fig. 10, with the rear side of the groove c open, and the ribs $a'$ on the guards thus become substantially hooks, against which the inclined front wall of the groove c is driven by the keys or wedges $c^2$.

The front edge of the cutter-bar D is formed into a series of inclined faces, which are adapted to fit against corresponding faces upon the wedge-bar D'. These two bars, when placed in the position shown by Fig. 1, with the inclined faces in contact, together form, in outline, a plain bar of the desired shape, which is adapted, by moving one or both bars longitudinally, to be expanded or contracted in width, and thus fasten or loosen the knives or sections E in the following manner: The cutter-bar D and the wedge-bar D' are arranged, as stated, with their inclined faces contiguous, the wider portions of each fitting into the narrower portions of the other, thus forming a bar of the same dimensions throughout. The knives or sections E, whose rear ends are bent into the required form to slide onto said bar, are then placed thereon. The nut $d'$ is then turned up against the cap $d^2$, which in turn presses against the end of the bar D' and pushes it in one direction, and at the same time draws upon the bar D in the other direction, causing the wider portions of the two bars to approach each other, and thus press outwardly against both sides of the groove formed in the rear portions of the knives, securing said knives rigidly in position.

When it is desired to remove the knives or sections from the cutter-bar, the nut $d'$ is turned back upon the threaded portion $d$, and the nut $d^4$ upon the threaded portion $d^3$, at the other end of the bar D, is turned up against the opposite end of the bar D', causing the wider portions of each bar to approach the narrower portions of the other, thus loosening the sections or knives E and permitting them to be removed at pleasure. This construction obviates all necessity for rivets or screws in fastening the sections upon the cutter-bar, and it also saves much time and labor in removing and replacing sections for the purpose of grinding, or when one has been broken or otherwise rendered useless.

The cutter-bar, when complete with the knives or sections thereon, is adapted to fit into a suitable way formed in the guards, secured in position therein by the formation thereof, thus dispensing with any separate fastening devices.

The knives or sections E are formed from sheet metal by being cut in the proper form and then bent around at the rear end to partly encircle the cutter-bar. Said knives are adapted to slide on or off said cutter-bar, except when said bar is expanded, as before described.

Having thus fully described my said invention, what I claim as new, and desire to secure by Letters Patent, is—

1. The combination, with knives or sections for mowing or reaping machines, the rear portions of which are formed to receive and partly encircle the cutter-bar, of a cutter-bar having upon one edge a series of inclined faces, and a wedge-bar having a corresponding series of inclined faces, and means for operating the same, whereby said knives may be secured upon said bar, substantially as set forth.

2. In combination with the knives or sections for mowing or reaping machines, the cutter-bar D, having a series of inclined faces upon one edge, and the wedge-bar D', with a corresponding series of inclined faces adapted to slide upon those of the bar D, said bar D having screw-threaded portions with nuts thereon as a means for operating the same, substantially as shown and described, and for the purposes specified.

3. The combination, in a guard-finger for mowers or reapers, of a ledger-plate, the rear portion of which is bent down and adapted to fit to the front wall of an opening, $a^2$, in said guard-finger, and a wedge, B', adapted to fit in between said bent-down portion and the rear wall of said opening, whereby said ledger-plate is secured in position, substantially as set forth.

4. The combination, with a guard-finger, A, having an opening, $a^2$, and a recess, $a^5$, of a ledger-plate, the front end of which is adapted to fit into said recess, and the rear portion of which is bent down into said opening, and a wedge, B′, the rear end of which is adapted to slide in a groove, $e$, formed upon the rear wall of the opening $a^2$, and the front portion of which is adapted to bear against said bent-down portion of the ledger-plate B and securely hold it in position, substantially as shown and specified.

5. The combination of a guard-finger for mowers or reapers having upon its rear end a flange or projection, $a$, and upon its opposite side a dovetailed rib or hook, $a'$, one being formed upon the top and the other upon the under side of said rear end of said finger, and a finger-bar, C, the front edge of which is adapted to slide between the flange $a$ and the opposite portion of said finger, and having a groove, $c$, adapted to receive the dovetailed rib or hook $a'$, whereby said finger is secured to said finger-bar, substantially as shown and described, and for the purposes specified.

6. The combination of the finger A, having an opening, $a^2$, the ledger-plate B, having a turned-down portion, $b$, the wedge B′, adapted to fit between the bent-down piece $b$ and the rear wall of the opening $a^2$, and the finger-bar C, having a groove, $c$, formed so as to receive the rib or hook $a'$ upon the finger, and the front portion adapted to slide between the flange $a$ and the opposite portion of said finger, all substantially as shown and specified.

7. The combination of the finger-bar C, having a dovetailed groove therein, and the finger A, having a dovetailed rib formed to fit into said groove, said dovetailed formation serving to secure said finger-bar and finger together, substantially as specified.

8. The combination of the fingers A, having dovetailed ribs $a'$ and projections $a^7$, the finger-bar C, having notches $c'$ and the keys $c^2$, substantially as described, and for the purposes specified.

In witness whereof I have hereunto set my hand and seal, at Indianapolis, Indiana, this 1st day of May, A. D. 1883.

HORACE R. ALLEN. [L. S.]

In presence of—
C. BRADFORD,
E. W. BRADFORD.